Patented Jan. 31, 1928.

1,657,803

UNITED STATES PATENT OFFICE.

AUGUST LEOPOLD LASKA AND ARTHUR ZITSCHER, OF OFFENBACH-ON-THE-MAIN, GERMANY, ASSIGNORS TO I. G. FARBENINDUSTRIE AKTIENGESELLSCHAFT, OF FRANKFORT, GERMANY.

AZO DYESTUFFS AND PROCESS OF MAKING SAME.

No Drawing. Application filed September 10, 1925, Serial No. 55,627, and in Germany September 20, 1924.

Our invention relates to new azodyestuffs and a process of making same, said dyestuffs having probably the general formula:

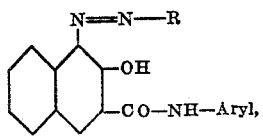

in which formula R represents the residue of a body of the diphenyl series, which dyestuffs are when dry scarlet red to black blue powders, soluble in sulfuric acid to a red to greenish blue solution, yielding on reduction with stannous chloride a monoaminobody of the diphenyl series and an arylid of 1-amino-2-hydroxy-3-naphthoic acid, which dyestuffs are adapted for the production of valuable color lakes, when mixed with the usual substrata, and dye, when produced on the fiber, the vegetable fiber in scarlet red to black blue shades of an excellent fastness, especially to kier boiling.

The materials, dyed in this manner, are also a part of the present invention.

The new dyestuffs may be obtained by combining diazotized mono aminobodies of the diphenyl series with the arylids of 2.3-hydroxynaphthoic acid.

The aminodiphenylbases, their homologues and substitution products may be used for the process, such as e. g. 2- and 4-aminodiphenyl, the aminoditolyls, chloro- and dichloro-aminodiphenyls, chloro-and dichloroaminoditolyls and others.

Remarkable are the dyestuffs, which are obtained by combining diazotized, dichlorinated aminobodies of the diphenyl series, with the arylids of 2.3-hydroxynaphthoic acid having probably the general formula:

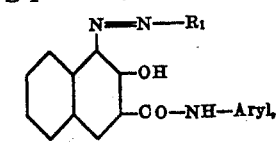

in which formula $R_1$ represents the residue of a dichlorinated body of the diphenyl series. If the two chlorine atoms of such amino bodies of the diphenyl series are in para-para' position, the dyestuffs obtained therefrom have probably the formula:

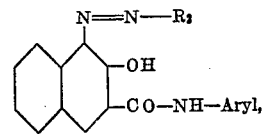

in which formula $R_2$ represents the residue of a 4.4'-dichlorinated body of the diphenyl series.

The aminodiphenylbases are obtainable according to the known processes. Among the derivatives, not described hitherto, the following may be mentioned:

Amino-4.4'-dichlorodiphenyl, which is obtained by nitrating 4.4'-dichlorodiphenyl and reducing the nitro compound thus obtained. It forms from alcohol crystalline feebly yellowish needles, melting at 95-96° C. (not corrected).

Amino - 3.3'-dimethyl - 4.4'-dichlorodiphenyl, obtained by nitrating 4.4'-dichloro-3.3'-ditolyl and reducing the nitro compound thus obtained, forming from alcohol crystalline colorless needles, melting at 88° (not corrected.)

4-amino-4'-hydroxy-diphenyl, obtained by boiling benzidin, which is diazotized only on the one side, forming from alcohol crystalline colorless leaflets, melting at 273° (not corrected).

As azocomponents all the arylids of 2.3-hydroxy-naphthoic acid may be used, such as e. g. the anilid, toluidids, anisidids, phenetidids, alpha- and beta-naphthalid, arylids. substituted by chlorine in the arylido residue, the bis-2.3-hydroxynaphthoyl-arylene-diamins and others.

The following examples illustrate the invention.

Example 1.

Cotton yarn, well boiled and dried, is impregnated with a solution of
10 gr. of the meta-chloroanilid of 2.3-hydroxy-naphthoic acid,
15 c.c. of caustic soda solution of 34° Bé. and
20 c. c. of Turkey red oil per liter, well wrung out and, without being dried, developed in a diazo solution containing 4.1 gr. of 4-amino-4'-chlorodiphenyl per liter and neutralized with chalk, rinsed and soaped.

In this manner dark garnet red shades of a very good fastness to kier boiling are obtained. The dyestuff thus produced probably has the following formula:

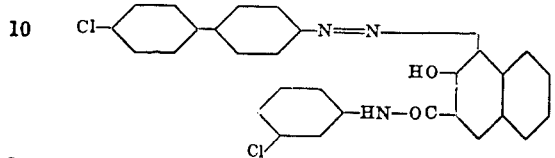

*Example 2.*

In the same manner as described in example 1, cotton yarn is impregnated with a solution of 10 gr. or 2.3-hydroxynaphthoyl-5-chloro-2-anisidin per liter and deleveped with a diazo solution, containing 3.4 gr. of 2-aminodiphenyl per liter.

A garnet red shade of a very good fastness to kier boiling is obtained. The dyestuff thus produced probably has the following formula:

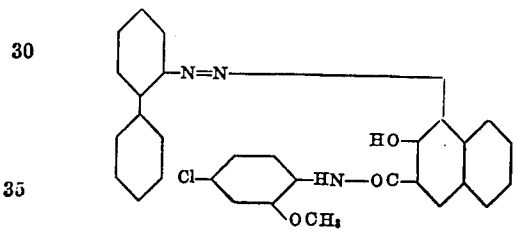

*Example 3.*

In the same manner cotton yarn is impregnated with a solution of 10 gr. of ortho-anisidid or 4 gr. of beta-naphthalid of 2.3-hydroxynaphthoic acid per liter and developed with a diazo solution containing 4.7 gr of amino-4.4' dischlorodiphenyl, melting at 95–96°, per liter, rinsed and soaped.

In this manner with the ortho-anisidid of 2.3-hydroxy-naphthoic acid bright scarlet shades, with the beta-naphthalid garnet red shades of a very good fastness to kier boiling are obtained.

The dyestuff thus obtained probably has the following formula, if produced from the ortho-anisidid of 2.3-hydroxynaphthoic acid:

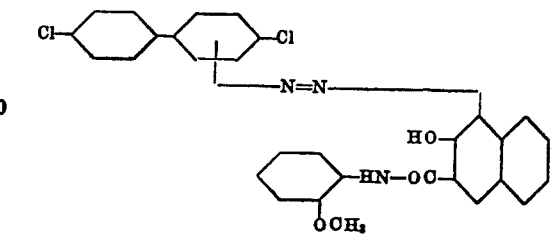

Amino-3.3' dimethyl-4.4 dichlorodiphenyl, dyed in the same manner upon the anilid of 2.3-hydroxynaphthoic acid, yields an intense red.

The following table gives the shades of a number of dyeings, prepared according to the present process.

| Diazocompound of: | Combined with 2.3-hydroxy-naphthoyl- | Shade: |
|---|---|---|
| 2-aminodiphenyl | Anilin | Bluish red. |
| Do | Alpha-naphthylamin | Do. |
| Do | Ortho-toluidin | Claret red. |
| Do | 4-chloro-2-anisidin | Red. |
| Do | 4-chloro-3-toluidin | Scarlet. |
| Do | 3-chloro-4-phenetidin | Bluish red. |
| Do | Bis-2.3-hydroxynaphthoyl-dianisidin | Dark garnet red. |
| 4-aminodiphenyl | Beta-naphthylamin | Claret red. |
| Do | Para-toluidin | Bluish red. |
| Do | 5-chloro-2-anisidin | Do. |
| Do | 2-chloro-4-anisidin | Claret red. |
| Do | 3-chloro-4-toluidin | Red. |
| 4-amino-4'-chlorodiphenyl | Beta-naphthylamin | Claret red. |
| Do | 4-chloro-2-anisidin | Do. |
| Do | 5-chloro-2-anisidin | Do. |
| Do | 5-chloro-2-toluidin | Dark garnet red. |
| Do | Bis-2.3-hydroxynaphthoyl-dianisidin | Brownish garnet red. |
| Amino-4.4'-dichlorodiphenyl (melting at 95-96°) | Meta-nitroanilin | Bluish red. |
| Do | Alpha-naphthylamin | Red. |
| Do | Para-anisidin | Bluish red. |
| Do | Para-phenetidin | Do. |
| Do | Ortho-chloroanilin | Scarlet. |
| Do | Para-chloroanilin | Bluish red. |
| Amino-3.3'-dimethyl-4.4'-dichlorodiphenyl | Meta-nitroanilin | Claret red. |
| Do | Beta-naphthylamin | Intense red. |
| 4-amino-4'-hydroxydiphenyl | Beta-naphthylamin | Reddish blue. |
| Do | Meta-chloroanilin | Do. |
| Do | 5-chloro-2-anisidin | Do. |

Now what we claim is:

1. As new compounds azodyestuffs, having probably the general formula:

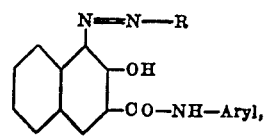

in which formula R represents the residue of a body of the diphenyl series, which dyestuffs are when dry, scarlet red to black blue powders soluble in sulfuric acid to a red to greenish blue solution, yielding on reduction with stannous chloride a mono amino-body of the diphenyl series and an arylid of 1-amino-2-hydroxy-3-naphthoic acid, which dyestuffs are adapted for the production of valuable color lakes, when mixed with the usual substrata, and dye, when produced on the fiber, the vegetable fiber in scarlet red to black blue shades of an excellent fastness, especially to kier boiling.

2. A process of making new azodyestuffs consisting in combining diazotized mono aminobodies of the diphenyl series with the arylids of 2.3-hydroxynaphthoic acid.

3. Materials dyed with the new dyestuffs of claim 1, said dyestuffs being produced on the fiber of the material.

4. As new compounds azodyestuffs, having probably the general formula:

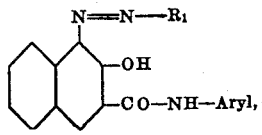

in which formula $R_1$ represents the residue of a dichlorinated body of the diphenyl series, which dyestuffs are when dry scarlet red to dark garnet red powders soluble in sulfuric acid to a red to violet solution, yielding on reduction with stannous chloride a dichlorinated mono aminobody of the diphenyl series and an arylid of 1-amino-2-hydroxy-3-naphthoic acid, which dyestuffs are adapted for the production of valuable color lakes, when mixed with the usual substrata, and dye, when produced on the fiber, the vegetable fiber in scarlet red to dark garnet red shades of an excellent fastness, especially to kier boiling.

5. A process of making new azodyestuffs consisting in combining diazotized dichlorinated mono aminobodies of the diphenyl series with the arylids of 2.3-hydroxynaphthoic acid.

6. Materials dyed with the new dyestuffs of claim 4, said dyestuffs being produced on the fiber of the material.

7. As new compounds azodyestuffs, having probably the general formula:

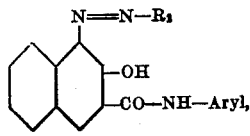

in which formula $R_2$ represents the residue of a 4.4'-dichlorinated body of the diphenyl series, which dyestuffs are when dry scarlet red to dark garnet red powders soluble in sulfuric acid to a red to violet solution, yielding on reduction with stannous chloride a 4.4'-dichlorinated mono-aminobody of the diphenyl series and an arylid of 1-amino-2-hydroxy-3-naphthoic acid, which dyestuffs are adapted for the production of valuable color lakes, when mixed with the usual substrata, and dye, when produced on the fiber, the vegetable fiber in scarlet red to dark garnet red shades of an excellent fastness, especially to kier boiling.

8. A process of making new azodyestuffs consisting in combining diazotized 4.4'-dichlorinated mono-aminobodies of the diphenyl series with the arylids of 2.3-hydroxynaphthoic acid.

9. Materials dyed with the new dyestuffs of claim 7.

In testimony, that we claim the foregoing as our invention, we have signed our names, this 31st day of August 1925.

AUGUST LEOPOLD LASKA.
ARTHUR ZITSCHER.